United States Patent [19]

Botzem et al.

[11] 4,423,802

[45] Jan. 3, 1984

[54] SHOCK ABSORBERS

[75] Inventors: Werner Botzem, Alzenau; Ortwin Knappe, Hanau; Peter Srostlik, Maintal, all of Fed. Rep. of Germany

[73] Assignee: Transnuklear GmbH, Hanau, Fed. Rep. of Germany

[21] Appl. No.: 287,472

[22] Filed: Jul. 27, 1981

[30] Foreign Application Priority Data

Jul. 26, 1980 [DE] Fed. Rep. of Germany ....... 3028424

[51] Int. Cl.³ .............................................. B60T 11/04
[52] U.S. Cl. .................................... 188/377; 206/591; 217/52; 220/200
[58] Field of Search ............... 188/377, 371, 376, 375, 188/374; 293/120, 133; 206/591, 592, 593; 248/635, 634; 217/52; 267/116; 220/200

[56] References Cited

U.S. PATENT DOCUMENTS 3,209,864 10/1965 Boyd .................................... 188/374
4,116,337 9/1978 Backus .............................. 206/591
4,190,160 2/1980 Andersen et al. .................. 188/377

Primary Examiner—Robert J. Spar
Assistant Examiner—Robert Oberleitner
Attorney, Agent, or Firm—Cushman, Darby & Cushman

[57] ABSTRACT

An improved cushioning or shock absorbing device attachable to the ends of a generally cylindrical container for transporting or storing radioactive material, especially spent nuclear fuel elements, has a substantially uniform dampening or cushioning characteristic even for different impact directions. The device is cap-shaped, having an annular part with a plug part in the outer end thereof. The annular part includes a strong rigid inner sleeve extending from the open end of the device partly between the two parts. The inner end of the plug part has a sheet metal disc-like inner cover secured to the sleeve for detachment on impact. Both parts are divided into a plurality of interior chambers by sheet metal plates, the chambers being filled with cushioning material. The container is provided with an exterior abutment surface spaced from and opposed to the inner end of the annular part, when the device is installed, so that the annular part is detached on impact and becomes effect to absorb shocks on engagement with the abutment surface.

14 Claims, 4 Drawing Figures

SHOCK ABSORBERS

FIELD OF THE INVENTION

This invention relates to improved cushioning devices or shock absorbers attachable to conventional cylindrical containers for transporting and/or storing radioactive material, especially spent fuel elements from nuclear reactors.

BACKGROUND OF THE INVENTION

Such containers must securely enclose and shield the radioactivity of the contained material, even after strain due to an accident, for example, the dropping of a container. Hence, such containers are designed for the attachment of, and have attached thereto at least during their handling and transportation phases, cushioning devices or shock absorbers. In the event of any impact to or by the container, as by being dropped, such shock absorbers must absorb as much deformation energy as possible so that in the event of impact the strain to the container and to its radioactive contents is slight.

Such shock absorbers are known, being disclosed, for example, in German Pat. No. 26 50 417 and German AS No. 28 30 305. Mostly such known cushioning devices involve multilayer structures of cushioning material extending transversely across the ends of the container. The layers are often separated by metal sheets perpendicular to the plane of the layers and have variable deformation characteristics. There are, however, known shock absorbers having multilayered structures extending circumferentially about the ends of the containers. All such known shock absorbers, however, have the disadvantage of being designed optimally for only a certain direction of impact and so react with variable cushioning or shock absorbing effect depending on the direction of impact.

SUMMARY OF THE INVENTION

Accordingly, it is an object of this invention to provide an improved cushioning or shock absorbing device that is simple to assemble and attach to the ends of a container for transporting or storing radioactive material and which has a substantially uniform dampening or cushioning characteristic even for different impact directions.

The object is attained by a cap-shaped shock absorber, attachable over the end portion a container, which has an annular part with a plug part in the outer end thereof. The annular part includes a strong rigid inner sleeve extending from the open end of the absorber partly between the parts. The bottom or inner end of the plug part has a sheet metal disc-like inner cover secured to the sleeve for detachment on impact. The annular part is divided by coaxial annular interior plates into a plurality of circumferential chambers. One of the radial walls is coplanar with the inner cover. The container is provided with an exterior abutment surface spaced from and opposed to the inner end of the annular part, when the absorber is installed, so that the annular part is detached on impact and becomes effective to absorb shocks on engagement with the abutment surface.

Other objects and advantages of the invention will become apparent from the following description and accompanying drawings in which:

DETAILED DESCRIPTION OF THE INVENTION

Figure 1:
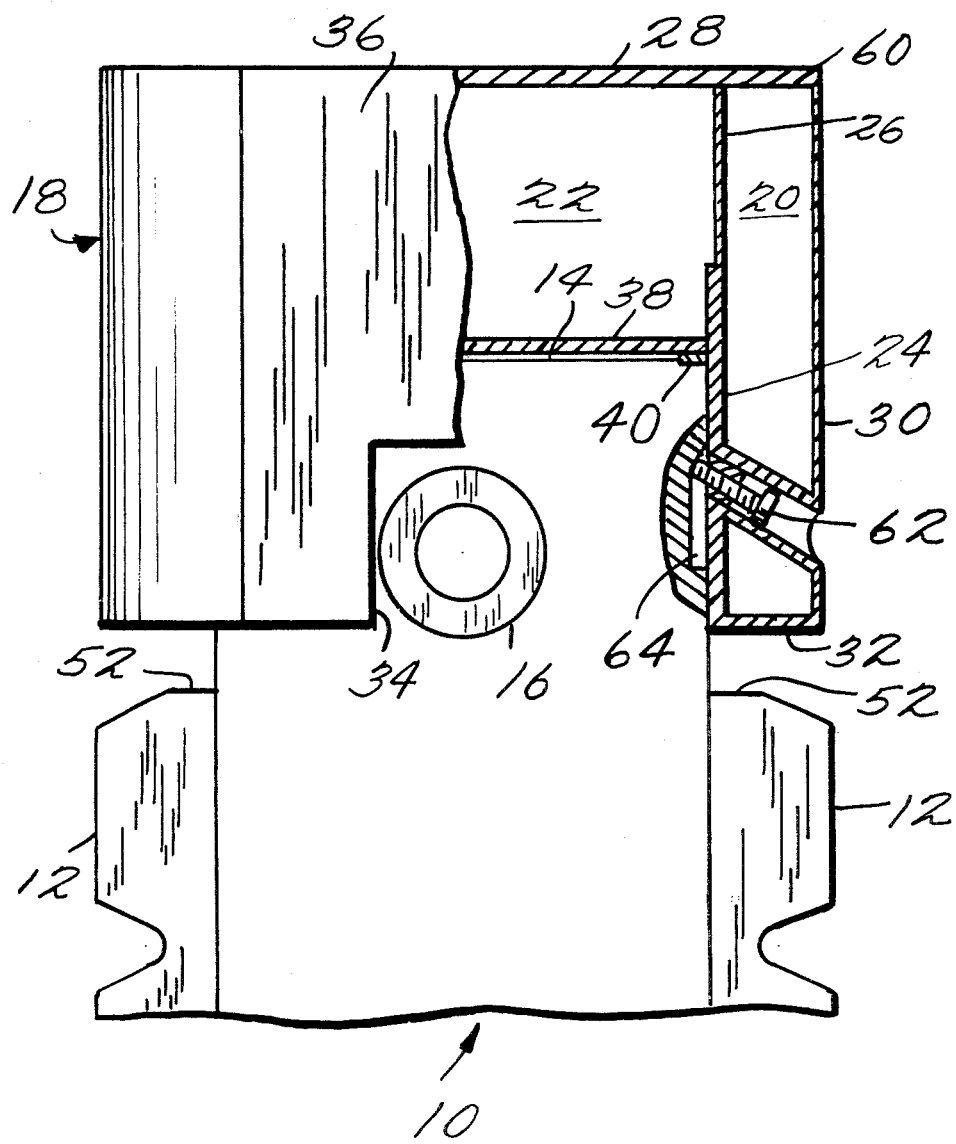
FIG. 1 is a schematic side view, partly in section and with interior details omitted, showing a shock absorber embodying this invention installed on one end of a cylindrical container for transporting and/or storing radioactive material.
Figure 4:
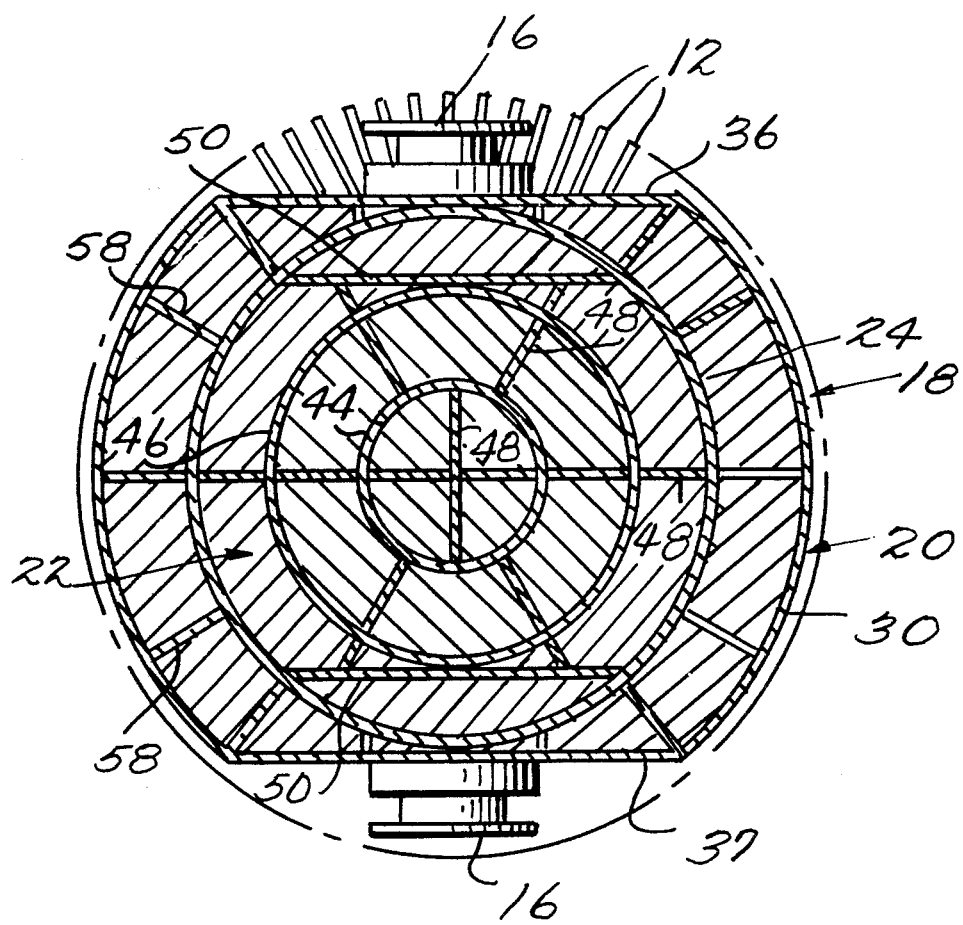
FIG. 4 is a schematic sectional view taken substantially on line 4—4 of FIG. 2.

Referring now to FIG. 1 of the drawings, there is shown an end portion of a cylindrical container 10 for transporting and/or storing radioactive material, especially spent fuel elements of nuclear reactors. The container 10 is provided with exterior longitudinal cooling fins 12, that terminate short of the container ends 14 and with the usual pairs of trunnion type lifting lugs 16 on the container side. Installed on both end portions of the container 10 are shock absorbers 18 embodying this invention. Each shock absorber 18 is in the shape of a cap having a ring or generally annular part 20 closed at its outer end by a plug part 22. The annular part 20 is provided with a thick-walled strong rigid inner sleeve 24, preferably of high grade steel, extending from the open inner end of the shock absorber 18 to and somewhat beyond the bottom or inner end of the plug part 22. The wall thickness of the sleeve 24, depending on the design of the container 10, preferably is of the order of 10–30 mm. A tube 26, preferably of metal, weaker than and of the same diameter as the sleeve 24, extends coaxially between the outer end of the sleeve and the outer end or top 28 of the shock absorber 18. The top or outer end 28 of the shock absorber 18 is formed by a sheet metal disc-like plate of a thickness, for example, of 12 mm. The shock absorber 18 has a generally cylindrical outer jacket 30 and an annular inner end plate 32, both preferably of sheet metal of a thickness, for example, of 5–10 mm. As shown in FIGS. 1 and 4 the opposite sides of the annular part 20 are provided with cutouts 34 to accommodate the lugs 16 and with exterior flat portions 36 to provide access to the lugs by lifting devices (not shown). The bottom or inner end 38 of the plug part 22 is formed by a strong disc-like plate, preferably of high grade steel of the order of 10–30 mm thick. A centering ring 40 of substantially the same outside diameter as the plate 38 is attached to the outer edge portion thereof to bear against the end 14 of the container 10.

Either the plate 38 or the ring 40, or both, is attached to the sleeve 24, the attachment being such that in the event of an impact having a directional component longitudinally of the container 10, detachment occurs and a relative shift takes place between the sleeve 24 and the plate 38, i.e. the sleeve moves inwardly of the plate. Hence, the shock absorber structure outside the sleeve 24, i.e. the annular part 20, does not participate appreciably in damping or absorbing the shocks of such longitudinal impact components.

Figure 2:
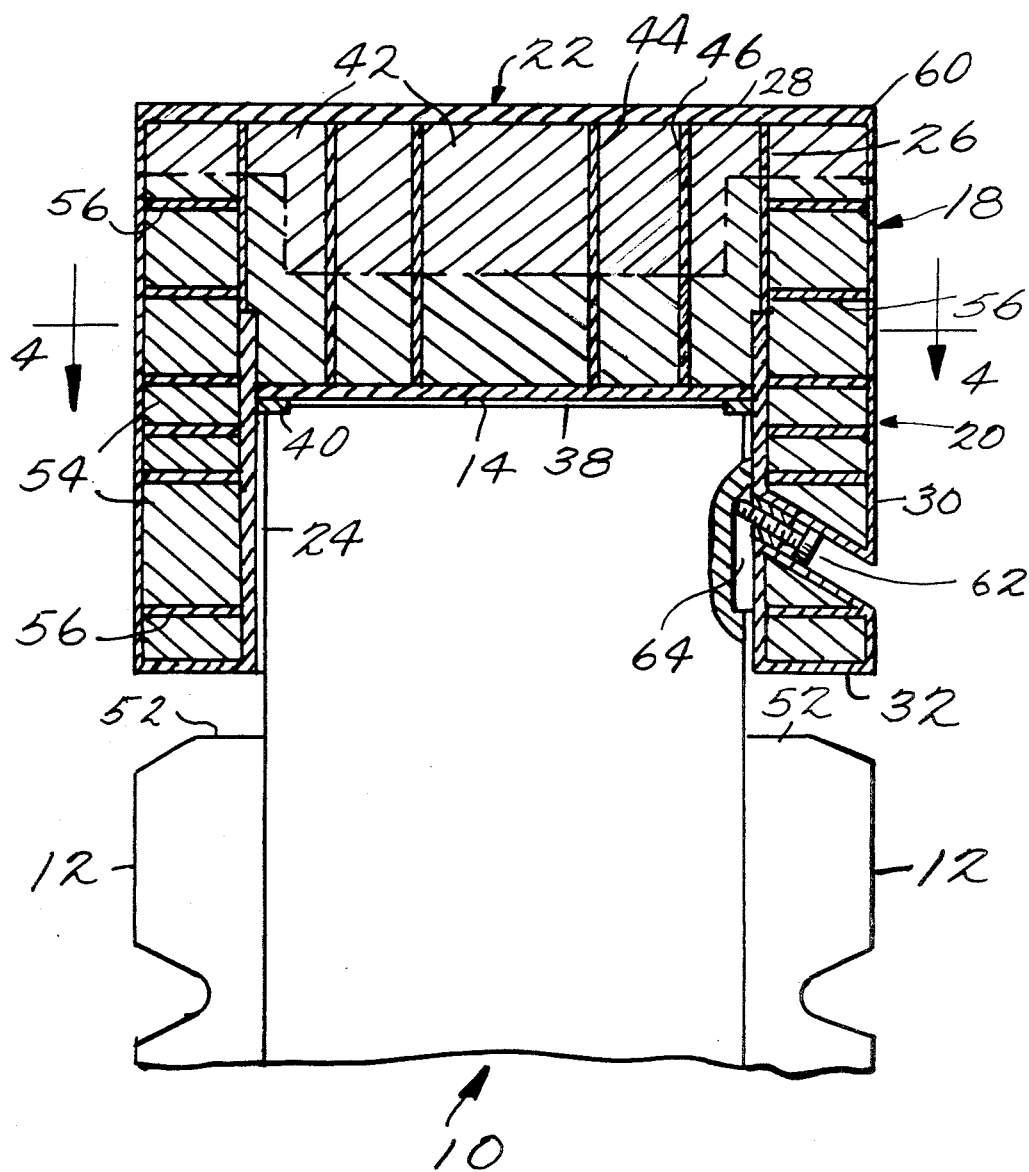
FIG. 2 is a view corresponding to FIG. 1 with the entire shock absorber being in longitudinal section and illustrating interior details.

On the other hand, the plug part 22 is effective in damping or absorbing the shocks of longitudinal components of an impact. For this purpose the plug part 22 is divided into a plurality of interior honeycomb-like chambers 42 by spaced light sheet metal tubes 44, 46 concentric with the sleeve 24 and extending between the ends of the plug part 22. These chambers 42 may be subdivided by radial stiffening or reinforcing light sheet metal plates 48 extending longitudinally of the plug part 22 between the tubes 44, 46, between the tube 46 and the sleeve 24 and tube 26, and interiorly of the tube 44. The chamber 44 between the tube 46 and the sleeve 24 may be further subdivided by plates 50 extending chordwise parallel to the flat portions 36, as shown in FIG. 4. Within these chambers 42 is disposed shock absorbing or impact dampening material. Adjacent the outer end of the shock absorber 18 i.e., outwardly of the dot-dash line in FIG. 2, such material consists of a thick layer of soft dampening material, e.g. balsa wood, while inwardly of the soft material, the damping material is harder, e.g. hard wood.

In the event of an impact having a longitudinal component, a three-dimensional state of compression and tension is developed in the damping material during the impact which tends to expand the material radially of the plug part 22. Such expansion is greatly impeded, however, by the sleeve 24 surrounding the inner end portion of the plug part 22. As a result, the plastic deformation capacity of the material is fully utilized for good shock absorption.

The shock absorption characteristic of the shock absorber 18 can be enhanced, depending on the specific design, by making the walls, i.e. tubes 44, 46 and plates 48, 50, of the several chambers of differing thicknesses and of differing materials.

Further enhanced damping or absorption of shocks caused by impacts with a longitudinal component is achieved by the provision of an abutment surface on the container in spaced opposed relation to the inner annular end of the shock absorber 18. Such abutment surface may be formed by the ends 52 of the cooling fins 12. The spacing between such abutment surface and the inner end of the shock absorber 18 is such that when an impact having a longitudinal component crushes the plug part 22 sufficiently, the ring or annular part 20 engages the abutment surface and furnishes further damping or shock absorption.

Figure 3:
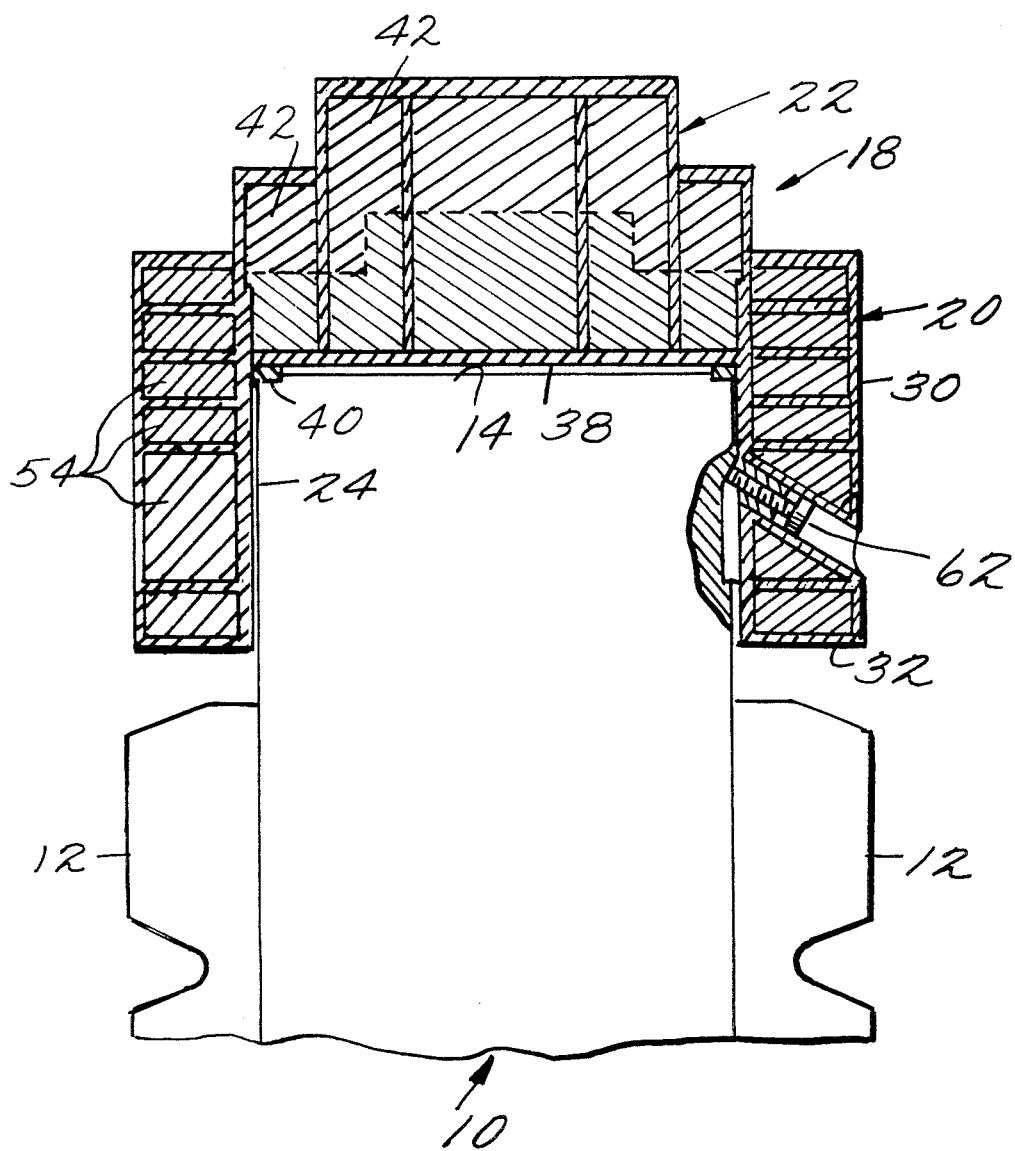
FIG. 3 is a view corresponding to FIG. 2 of a modification of the invention.

In some cases the shock absorbing characteristic of the plug part 22 can be enhanced by making the chambers 44 therein of different longitudinal dimension, as shown, for example, by the stepped configuration shown in FIG. 3. Preferably the enveloping contour of the chambers 44 having different longitudinal dimensions has a parabolic cross-section. In this arrangement the annular part 20 does not extend to the top of the plug part 22 at the periphery thereto.

The annular or ring part 20 also is divided into a plurality of annular chambers 54 by spaced, parallel, concentric, annular light sheet metal plates 56, which chambers are further subdivided by radial light sheet metal plates 58 normal to the annular plates, as shown in FIG. 4. These chambers 54 also are filled with damping material, for example, a relatively thin layer of balsa wood adjacent the outer end of the ring part 20 and the balance hard wood.

In the event of an impact having a radial component, for example an inclined impact on the edge 60, the annular part 20 will be put under a great strain. This will produce a three-dimensional state of compression and tension in the shock absorbing material in the chambers 54 between the several radial walls or plates 56, 58. These plates are attached to the outer jacket 30 and at least some to the sleeve 24. One plate 56 is in the plane of the plate 38. As a result, expansion of the material in a radial direction is limited so that bursting of the jacket 30 will be avoided for the most part. Because radial expansion of the deformed ring part 20 is so impeded, tensions are created in the annular plates 56 which are absorbed by the sleeve 24. After a certain deformation of the ring part 20 by such an impact against the edge 60, a sufficient longitudinal force component will act on the ring part to cause relative shifting between the sleeve 24 and the plate 38 and ring 40, so that the plug part 22 will then begin to participate in damping or absorption of the shock. Of course, if the impact is sufficient to cause the ring part 20 to engage the abutment surface 52, the shock absorbing function of the ring part begins anew. Again it is advantageous to form the plates 56, 58 of different thickness depending on the specific objects of the design.

The shock absorber 18 is fixed to the end portion of the container 10, against relative radial movement therebetween, by the sleeve 24. Fixation against relative longitudinal movement is had by set screws 62 threaded into apertures in the ring part 20 inclined away from the end 14 of the container 10 and bearing against inclined outer end walls of exterior longitudinal grooves or key ways 64 in the container. Thus, shifting of the sleeve 24 relative the plate 38 and ring 40 on an impact having a longitudinal component is not impeded by the attaching or fixing arrangement. This arrangement is much simpler than known arrangements for attaching shock absorbers to the ends of containers by screws threaded into tapped apertures in the container ends.

Preferably, the entire outer plating of the shock absorber 18 is of gas-tight construction and the outer jacket 30 provided with apertures having fusible plugs (not shown) to relieve interior pressure in case of an accident involving a fire.

We claim:
1. Cap-shaped shock absorber means for attachment over the cylindrical end portion of a container for transporting and/or storing radioactive material, especially spent nuclear fuel elements, the container having means arranged circumferentially about the container adjacent the inner end of and projecting radially outwardly beyond the end portion and defining an abutment surface facing the end of the container, comprising:
   an annular part adapted to fit snugly over the end portion of the container and having inner and outer ends;
   a plug part detachably secured in said outer end of said annular part, the inner end of said annular part being spaced from the abutment surface when said shock absorber is installed on the container;
   said annular part including a strong rigid inner sleeve extending from the open end of said annular part past the inner end of said plug part to a location between said parts spaced from the outer end of said plug part;
   means securing said sleeve to said plug part for detachment therefrom on an impact with said shock absorber having a directional component extending longitudinally of the container; and
   shock absorbing material enclosed within each of said parts, the material in said plug part being constructed and arranged to have less resistance to crushing on such impact than that in said annular part, whereby on such impact said annular part becomes detached from said plug part and does not participate effectively in shock absorption of such impact until said plug part is crushed sufficiently to allow the annular part to engage with the abutment surface.

2. The structure defined in claim 1 wherein the plug part is divided into interior chambers by spaced concentric tubes arranged coaxially within said plug part and extending between the inner and outer ends thereof.

3. The structure defined in claim 2 including radial plates extending between the ends of the plug part and subdividing the interior chambers.

4. The structure defined in claim 2 wherein the shock absorbing material is enclosed within the chambers with the material in the outer portions of the chambers being relatively soft and the material in the inner portions being relatively hard.

5. The structure defined in claim 1 wherein the annular part is divided into interior chambers by annular plates arranged coaxially with said annular part in spaced relation longitudinally thereof and extending between the inner and outer sides thereof.

6. The structure defined in claim 5 in which one plate is substantially coplanar with the inner end of the plug part.

7. The structure defined in claim 5 including radial plates extending longitudinally of the annular part and subdividing the chambers.

8. The structure defined in claim 5 in which the shock absorbing material is enclosed within the chambers.

9. The structure defined in claim 1 wherein the end portion of the container is provided with a circumferential array of exterior longitudinal grooves terminating short of the end of the container and including set screws extending through the annular part into said grooves to secure the shock-absorber to the container.

10. The structure defined in claim 9 wherein the grooves have outwardly inclined outer end walls and the set screws bear against such walls.

11. The structure defined in claim 2 wherein the outer end of the plug part has a symmetrically stepped configuration in diametric longitudinal section with said plug part projecting out of the outer end of the annular part.

12. The structure defined in claim 2 wherein the tubes are of different thicknesses.

13. The structure defined in claim 5 wherein the annular plates are of different thicknesses.

14. The structure defined in claim 1 wherein the abutment surface is defined by the ends of longitudinal cooling fins.

* * * * *